United States Patent
Kato et al.

[11] 3,917,380
[45] Nov. 4, 1975

[54] METHOD OF HOLOGRAM RECORDING WITH REDUCED SPECKLE NOISE

[75] Inventors: Makoto Kato; Yoshihiro Okino, both of Kadoma, Japan

[73] Assignee: Matsushita Electric Industrial Company, Limited, Japan

[22] Filed: Dec. 26, 1973

[21] Appl. No.: 428,056

[30] Foreign Application Priority Data

Dec. 25, 1972  Japan .................................. 48-3257
Dec. 26, 1972  Japan .................................. 48-3824
Dec. 29, 1972  Japan .................................. 48-3760
Dec. 29, 1972  Japan .................................. 48-3758

[52] U.S. Cl. ............................................. 350/3.5
[51] Int. Cl.$^2$ ..................... G03H 1/16; G03H 1/32
[58] Field of Search .......................... 350/3.5; 340/173 LT, 173 LM; 250/550

[56] References Cited
UNITED STATES PATENTS

| | | | |
|---|---|---|---|
| 3,580,655 | 5/1971 | Leith et al. ........................ | 350/3.5 |
| 3,604,778 | 9/1971 | Burckhardt ........................ | 350/3.5 |
| 3,614,189 | 10/1971 | Stewart et al. .................... | 350/3.5 |
| 3,744,871 | 7/1973 | Takeda et al. ..................... | 350/3.5 |

*Primary Examiner*—Ronald J. Stern
*Attorney, Agent, or Firm*—Robert E. Burns; Emmanuel J. Lobato; Bruce L. Adams

[57] ABSTRACT

A sampling mask having a regular array of light transmitting areas is superimposed by a phase mask having a random array of phase shifting areas. The superimposed sampling and phase masks are holographically recorded for producing a hologram which later acts as a beam splitter to provide object and reference beams. The hologram so prepared is illuminated with a spatially incoherent broad source of light and imaged through an optical system. The zero order diffracted wave serves as the reference beam and the first order diffracted wave is used to illuminate an object transparency which is placed in the focused beam of the first order wave. Each point source of light from the spatially incoherent broad light source produces a corresponding interference fringe pattern, and it is shown that the interference pattersn exactly overlaps one upon another so that sharply defined fringe contrast results. The size of the light source is determined only by the required degree of resolution which in turn is dependent on the sampling spacing. The use of the incoherent broad light source enables uniform illumination of the object transparency, resulting in high-quality holograms with reduced speckle noise.

12 Claims, 15 Drawing Figures

Fig. 10
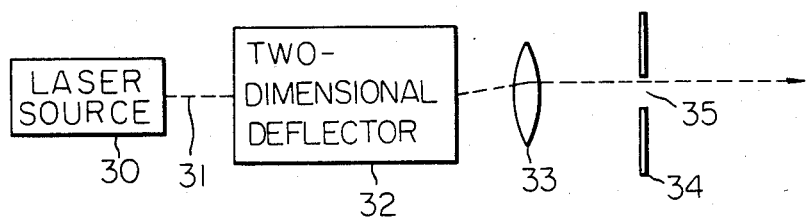
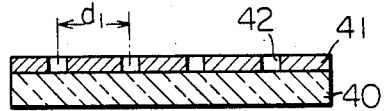
Fig. 11a
Fig. 11b
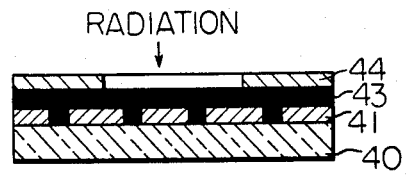
Fig. 11c
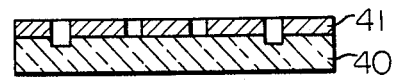
Fig. 11d

METHOD OF HOLOGRAM RECORDING WITH REDUCED SPECKLE NOISE

The present invention relates generally to holography and specifically to off-axis holography. More specifically it relates to the improvement in the off-axis holography which permits highly redundant recording of a two dimensional continuous tone hologram with minimized speckle noise.

Various methods are known in the art to produce off-axis holograms. The use of a single beam for illuminating an object produces a hologram with less redundancy in the recorded information: hence there is greater susceptibility to impairment due to stains or dust on the hologram plane. Attempts have been made to overcome such disadvantages. A first prior art method involves the use of a frosted glass plate for diffusing light in all directions at the output side thereof and illuminating an object with the diffused light. Although this method permits recording of a highly redundant visual information, an objectionable speckle noise pattern is produced because the frosted glass contains spatially random phase information of broad band spectrum and such phase information is intercepted by the finite size of an aperture provided in the hologram system. Since the speckle noise becomes increasingly objectionable with decrease in hologram size, the use of a frosted glass is not considered suitable for high density hologram recording. In a second prior art method, an object is placed behind a combination of a sampling mask and a phase mask. The sampling mask consists of a pattern of regular array of small transparent areas. The phase mask consists of randomly arranged phase shifting areas, so that half of the areas impart a phase shift of 180° to the light incident on it, while the remaining areas impart a phase shift of zero degree. The object is illuminated with the sampled rays of light and transmits a multiplicity of modulated beams to a hologram plane. Although this arrangement is suitable for applications where information to be recorded is in the form of a discrete bit pattern, it is not suitable for recording continuous-tone images since Moire Patterns are produced between the sampling array and the object pattern. If the size of each transparent area in the sampling mask is enlarged so as to reduce the contrast of the Moire fringe, an objectionable interference effect occurs at the junctions of adjacent phase shifting areas.

An object of the present invention is therefore to provide an improved method for holographically recording a continuous-tone visual information without introducing appreciable speckle noise as well as Moire and other noise patterns.

Another object of the invention is to provide an improved holographic recording method whereby coherence requirement is considerably eased.

In accordance with the present invention, a Fourier transform hologram is produced by recording on photographic film the interference fringe pattern resulting from the illumination of a pair of masks with a reference beam. The pair of masks consists of a sampling mask consisting of regularly arranged light-transmitting areas or spots and a phase mask consisting of randomly arranged phase shifting areas which impart a phase shift randomly chosen between 0° and 360° to the light incident on it, each of the transparent areas being completely aligned with each of the phase shifting areas. As an example, 50 percent of the phase shifting areas apply a phase shift of 180° and the remaining areas apply a phase shift of 0°. The hologram so prepared serves as a beam splitter and is placed in a collimated beam from a spatially incoherent broad source of light to produce sampling beams used for illuminating an object transparency. Wavefronts transmitted through the beam splitter consist of a zero order wavefront, a pair of first order wavefronts and other wavefronts called "distortion terms" and is focused by a converging lens or a Fourier transform lens onto an object plane placed on a focal distance away from the lens. The zero order wavefront is passed as a reference beam through an aperture located on the object plane. Part of the first order wavefronts produces the reconstructed image of the original sampling mask at the focal plane of the lens where an object transparency is placed. The sampled beams which illuminate the object transparency are modulated in accordance with the transmittance of the transparency. A hologram is produced by using a second Fourier transforming lens and refocusing the zero order and the modulated first order wavefronts onto a photographic film placed at the conjugate plane or the image plane of the beam splitter with respect to the imaging system.

These objects, features and advantages of the present invention will be more clearly understood from the following detailed description when read in conjunction with the accompanying drawings, in which:

FIG. 10 is a schematic illustration of an arrangement to provide two-dimensionally scanned laser beams as spatially incoherent light sources;

FIGS. 11a through 11d illustrate a process for fabricating a combination sampling and phase mask in a one-piece construction.

Figure 1:
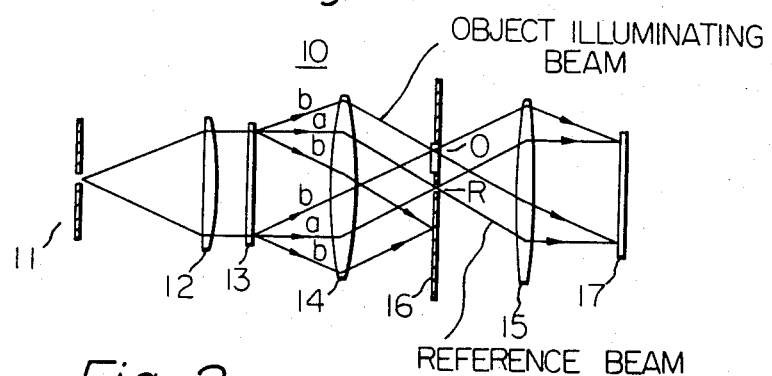
FIG. 1 is a schematic illustration of an achromatic fringe interferometer arrangement embodying the present invention.
Figure 2:
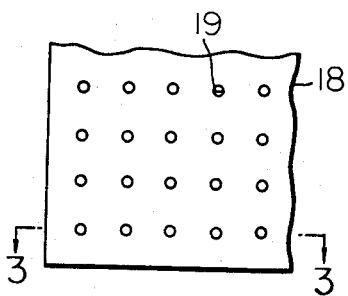
FIG. 2 is a plan view of a sampling mask constructed in accordance with the present invention.
Figure 3:
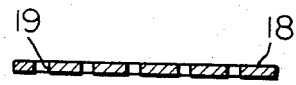
FIG. 3 is a cross-sectional view of the sampling mask taken along the line 3—3 of FIG. 2.
Figure 4:
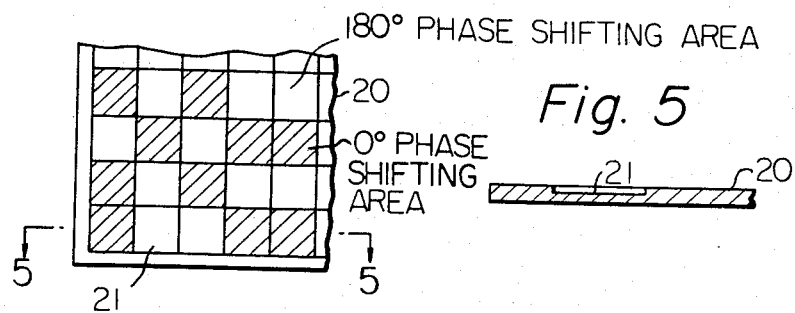
FIG. 4 is a plan view of a phase mask of the present invention illustrating the pattern of phase shifting areas.
Figure 5:
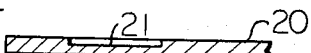
FIG. 5 is a cross-sectional view of the phase mask taken along the line 5—5 of FIG. 4.

Referring now to the drawings, particularly to FIG. 1, there is schematically shown an exemplary arrangement of achromatic fringe interferometers embodying the present invention. The achromatic fringe interferometer in general is employed for recording off-axis holograms and characterized by its ability to obtain a sharply defined interference fringe pattern even though use is made of a source of incoherent light the kind which emits light of broad spectrum range. The interferometer 10 particularly defined by the present invention comprises a light source 11 for emission of monochromatic but spatially incoherent beam, a collimating lens 12, a holographic beam splitter 13 which will be described in detail hereinbelow, first and second Fourier transform lenses or converging lenses 14 and 15, an apertured mask 16 placed at an object plane at a distance of the focal length of the lens 14 and a hologram recording plate located at the conjugate plane of the beam splitter 13 with respect to the lens system. The use of monochromatic light is not necessary for applications where powerful coherent light source is not available as will be understood as the description proceeds. The light beam from a given point of the incoherent broad source of light 11 is collimated by the lens 12 and emerges at the output side of the beam splitter as a zero order array of sampled, phase shifted beams (a) and a pair of first order array of sampled phase shifted beams (b). The zero order wavefront is focused by the first converging lens 14 onto a reference-beam aperture R located at the focal point of the lens 14 placed at the central portion of the apertured mask 16 and is made to be incident on the hologram recording plate. On the other hand, part of the first order wavefronts is intercepted by the lower half section of the apertured plate and the other first order wavefront is admitted to pass through an object aperture O provided at the upper half section of the apertured plate wherein an object transparency to be recorded is placed. Therefore, the object transparency is illuminated with one of the first order wavefronts to modulate it in accordance with the transmittance of the object transparency. The modulated wavefront is made to be incident on the photographic film to interfere with the reference beam. Interference effect occurs between the two wavefronts incident on the film and a hologram is thus produced. The light beams from other points of the source 11 also produce interference fringes respectively at the hologram plane 17. The fringe contrast at the hologram plane, however, is not reduced at all as will later be described further in detail. It is to be understood that the present invention is not limited to a Fourier holography using an achromatic-fringe interferometer: the invention is also applicable to other types of holography such as Fresnel holography and image plane holography. It will be understood that the beam splitter 13 may not only be illuminated with an on-axis collimated beam but also with an off-axis collimated beam. Therefore, the present invention is not limited to the arrangement as shown and described with reference to the attached drawings.

Figure 6:
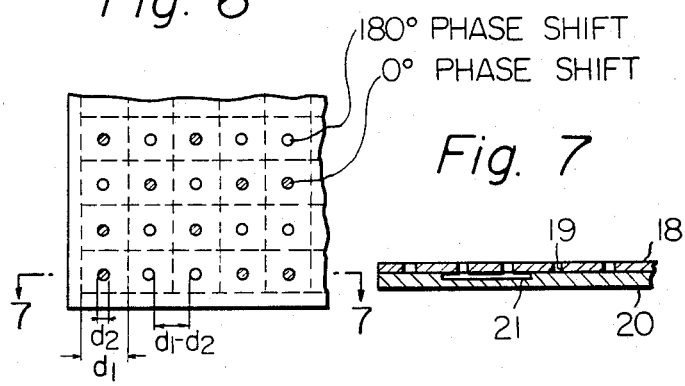
FIG. 6 is a plan view of the sampling mask of FIG. 2 superimposed on the phase mask of FIG. 4.
Figure 7:
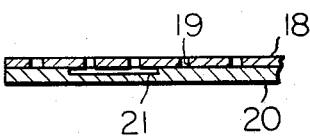
FIG. 7 is a cross-sectional view of the superimposed masks of FIG. 6 taken along the line 7—7 of FIG. 6.
Figure 8:
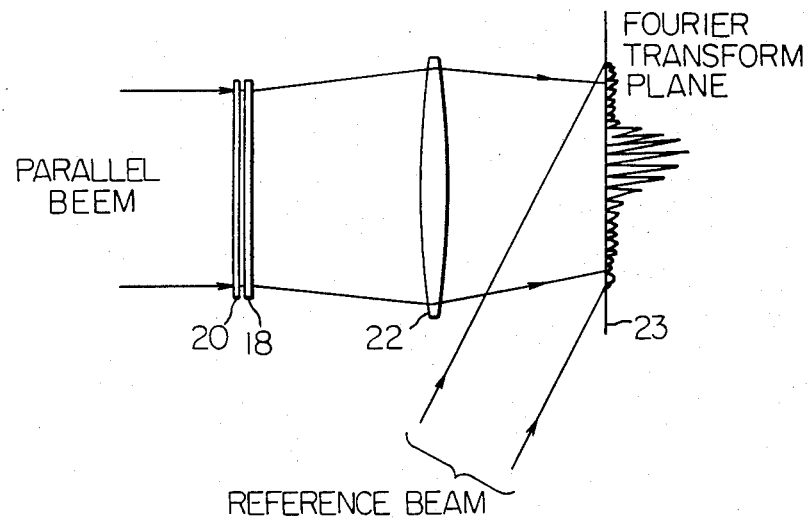
FIG. 8 is a schematic illustration of a conventional system for recording Fourier transform holograms of the superimposed sampling and phase masks of FIG. 6.
Figure 9:
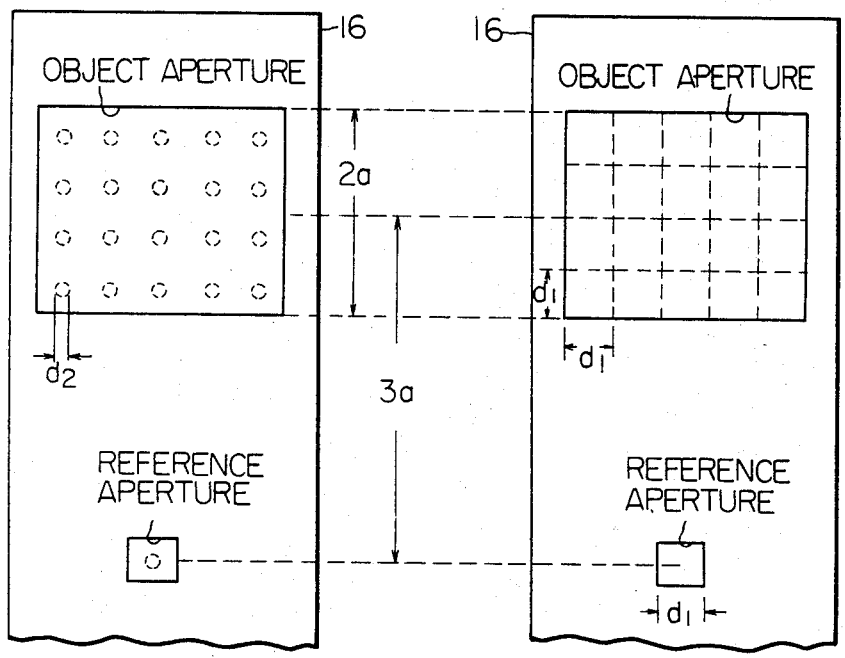
FIGS. 9a and 9b are partial view of an aperture mask in accordance with the present invention.

In accordance with the present invention, the holographic beam splitter 13 is prepared as follows: a sampling mask 18 of an opaque material having a regular array of transparent areas or apertures 19 is superimposed on a phase mask 20 of transmitting material having discretely varying depressions 21 randomly arranged to impart a phase shift of 180° (white areas) to the light incident on it, with the remaining portion (shaded areas) imparting a phase shift of 0°. FIGS. 2 through 7 illustrate portions of the sampling mask 18 and the phase mask 20. Fifty percent of the total area of the phase mask apply a phase shift of 180° while the remaining areas apply a phase shift of 0°. The sampling and phase masks are aligned such that each of the transparent areas of the former falls completely within one discrete phase shifting area of the latter. As shown in FIGS. 6 and 7, the combination of the two masks looks like a new mask where the light transmitted through half the transparent areas undergoes a phase shift of 180° while the light transmitted through the remaining areas undergoes a zero phase shift. In FIG. 8, the combination of these masks is placed in the front focal plane of a Fourier transform lens 22 and is illuminated with a coherent parallel light beam. A reference light is also made to fall on the hologram plane 23 so that a hologram is formed. It will be understood that the hologram thus produced is of Fourier transform type. It is the Fourier transform hologram that is placed in the position of the beam splitter 13 in the FIG. 1. The hologram will produce the reconstructed image of the original sampling pattern when illuminated with a point source of light. As previously described in connection with FIG. 1, the first order wavefront corresponding to the source point of source is made to be focused on the object plane O and illuminates it as shown in dashed circles in FIG. 9a on an enlarged scale for purposes of clarity. In FIGS. 9a and 9b the reference aperture is located at a distance $3a$ from the center of the object aperture having a width $2a$ to assure complete separation of reconstructed images.

In accordance with another aspect of the present invention, the size of the reference-beam aperture R is enlarged as shown in FIG. 9a and FIG. 9b so that spatially dispersed reference beam is allowed to pass therethrough using in conjunction therewith a light source which has a substantially square shaped light emitting area and emits spatially incoherent light. This arrangement also causes the reconstructed sampling pattern on the object plane O to be blurred so that the periphery of each elementary area of the pattern spreads outwardly to adjacent areas. The illumination of an object with such sampled beams using a combined effect of the enlarged reference-beam aperture and spatially incoherent beam has the effect of avoiding an objectionable Moire fringe pattern which will be caused when the object transparency contains a recurrent pattern, such as a television test pattern used in telecasting, which repeatedly occurs at an interval close to the interval at which the sampling pattern is arranged. In other words, this arrangement serves to increase the amount of light incident on the object so that greater amount of object information can be recorded than if a point source of light is used in combination with the small reference aperture. The use of spatially incoherent light also reduces the unwanted interference effect on the object. Spatially incoherent light is obtained by, for example, passing a coherent monochromatic light such as a laser beam through a rotating frosted glass disc to cause a spatial disturbance of the coherence. A dispersed beam of stronger intensity can be obtained when a monochromatic light is two-dimensionally scanned across a plane normal to the direction of light. For carrying out the two-dimensional scanning of light, a laser beam is deflected by means of Bragg diffraction principle using a conventional supersonic deflector or by means of a set of rotating or vibrating prism or lens systems as shown in FIG. 10. In FIG. 10, an exemplary beam scanning arrangement is schematically shown in which reference numeral 30 represents a laser light source which emits a coherent monochromatic light beam 31 which is deflected by the deflector 32 consisting of a set of one-dimensional supersonic deflectors positioned at right angles to provide a two-dimensional deflection system or a set of rotating or vibrating lens or prism system, and focused by a lens 33 onto the plane of light emission aperture 35 of a plate 34 which serves as the plane of light source. The monochromatic coherent light beam thus scans across the aperture 35 and emerges as a spatially incoherent dispersed light beam. The aperture 35 serves to restrict the amount of output beam and can be dispensed with if desired.

As has been apparent from the foregoing that the present invention is characterized in that a hologram is produced on a hologram recording plate by illuminating an object transparency with a first order wavefront diffracted by a holographic beam splitter through a first Fourier transform lens, and superimposing on the zero order wavefront the first order wavefront modulated by the object transparency and transmitted through a second Fourier transform lens. Although each of the points of light source contributes to the formation of individual interference fringe patterns, it was shown that these interference patterns exactly overlaped one upon another so that a sharply defined image contrast of interference pattern resulted. It is important to note that the power of resolution obtainable is dependent upon both the size of the light source and the sampling spacing, or the number of transparent areas per unit area on the sampling mask. Therefore, the size of the light source is determined by the sampling spacing as shown in FIG. 9b.

In applications where a coherent light source is not readily available, the present invention can provide a useful method for producing high quality holograms though the resolution obtainable is not uniform over the entire surface of the reconstructed image plane because of the broad spectrum of the temporal frequency used in the recording stage of the hologram. The light intensity of a single elemental area of the image reconstructed from the final hologram is proportional to the average light intensity modulated by the transmittance of the corresponding elemental area ($d_1 \times d_1$) of the object. The averaging precedure in the recording stage of the hologram results in a reconstruction of an image with less Moire fringes as well as reduced speckle noise. The present invention has a further advantage in that the use of spatially dispersed incoherent source for illuminating an object permits the elemental transparent areas of the sampling mask 18 to be arranged at a spacing ($d_1 - d_2$) larger than the aperture diameter ($d_2$) as shown in FIG. 6, and consequently, high precision is not required of the mask alignment. The reduction in the size of the elemental transparent areas without introducing Moire patterns in the reconstructed images gives another advantage in that diffraction efficiency is increased in the reconstruction stage of the final hologram since the spatial frequency spectrum of the sampling array is increased.

The sampling mask 18 and the phase mask 20 can be fabricated as a one-piece construction using photoetching technique as follows: in FIGS. 11a through 11d, depositing on a glass substrate 40 a thin film 41 of chromium having an array of apertures 42 arranged at a spacing $d_1$ between centers; applying a film of photoresist 43 on the chromium film; printing a mask 44 of transparent squares randomly arranged at equal spacings and aligned so that each of the half of the apertures 42 falls completely within each of the squares; immersing the unexposed area in an ammonium fluoride solution so that only those portions of the glass substrate which fall within the unexposed area are etched away to a depth equal to the half wavelength of the light incident on it. Since the apertures are arranged at a relatively larger spacing between centers than the aperture diameter, the random pattern mask 44 can be aligned with the aperture mask 41 with less precision. To achieve more efficient diffusion of light incident on the beam splitter, the entire area of the apertured mask is divided into four randomly arranged discrete phase shifting areas, each being spaced a quarter wavelength apart from another. For carrying out this purpose, the photo-etching process is repeated three times in a similar manner described above: in the first etching process, the aperture mask 41 is deposited on the glass substrate 40 and applied with a coating of a photoresistive film 43 and then a first phase mask having half of its entire light transmitting square shaped areas arranged randomly thereon is placed on the film and subjected $\phi$ to a uniform radiation. Subsequently, the substrate is etched to a depth corresponding to $\lambda/2(n-1)$, where $\lambda$ is the wavelength of the light incident on it and n being the index of refraction of said substrate so that the etched portions of the substrate impart a phase shift of 90° to the incident light. In the second etching process the same process is repeated except that the first phase mask is replaced with a second phase mask having half of its entire squares arranged randomly but differently from the arrangement of those of said first mask so that the etched portions impart a phase shift of 180° to the incident light. Similarly, in the third etching process, the process is repeated replacing the second mask with a third mask having a differently arranged random pattern of light transmitting squares so that the etched portions impart a phase shift of 270° to the incident light. Therefore, each of the four randomly arranged phase shifting areas applies a phase shift of 0°, 90°, 180° and 270°, respectively, to the incident light. It is to be noted that the phase mask can be arranged to effect phase shifting at any desired phase angles in the range of 0° and 360° of the incident light wavelength if they form a set of equal numbers of oppositely going amplitudes so that they destruct each other when combined together at the hologram plane. In the case described above, 0° and 180° form a pair of oppositely going amplitudes, and 90° and 270° form another pair.

What is claimed is:

1. A holographic recording system for recording the hologram of an object transparency comprising:
   a random phase illumination hologram receptive in use of substantially monochromatic spatially incoherent light for diffracting the incoherent light incident thereon into a zero-order diffracted beam of light and into a first-order diffracted array of sampled, phase-shifted beams of light;
   an image forming lens system receptive of the zero-order diffracted beam and the first-order diffracted array of light beams for focusing the zero-order diffracted beam and the first-order diffracted array of light beams in a focal plane which is also a Fourier transform plane with respect to said random phase illumination hologram;
   a mask having a first and a second aperture and disposed in the focal plane of said image forming lens system for allowing the transmittance of only the zero-order diffracted beam and the first-order diffracted array of light beams through the first and second apertures, respectively, and beyond the focal plane;

whereby the positioning of said object transparency in the focal plane at the second aperture of said mask will result in the intensity modulation of the first order diffracted array of light beams to form a holographic interference pattern between the zero-order difrracted beam and intensity modulated first-order diffracted array of light beams in a plane conjugate to said random phase illumination hologram with respect to said image forming lens system.

2. A holographic recording system according to claim 1 further comprising, a hologram recording plate disposed in said conjugate plane for recording the holographic interference pattern.

3. A holographic recording system according to claim 1 further comprising, a source of substantially monochromatic spatially incoherent light disposed to illuminate said random phase illumination hologram.

4. A holographic recording system as claimed in claim 3 further comprising a lens interposed between said light source and said random phase illumination hologram for collimating the incoherent light incident on said random phase illumination hologram.

5. A holographic recording system as claimed in claim 3, wherein said incoherent light source extends in two dimensions to disperse each of said sampled beams outwardly with respect to the adjacent sampled beams.

6. A holographic recording system as claimed in claim 3, wherein said incoherent light source comprises means for scanning a coherent light beam in two dimensions.

7. A holographic recording system as claimed in claim 3, wherein said incoherent light source comprises means for passing a coherent light beam through a vibrating light diffusing medium.

8. A holographic recording system as claimed in claim 5, wherein said second aperture has a square shape and has an area equal to the cross-sectional area of each of said dispersed sampled beams.

9. A holographic recording system according to claim 1 wherein said image forming lens system comprises, a first Fourier transforming lens receptive of the zero-order beam and the first order diffracted array of light beams for focusing the light beams in the focal plane, and a second Fourier transforming lens aligned to receive the light beams focused by said first Fourier transforming lens and spaced a focal length from the focal plane.

10. A holographic recording system as claimed in claim 1, wherein said random phase illumination hologram is prepared by a process comprising the steps of:
   a. providing a sampling mask having an array of light transmissive areas;
   b. superimposing on said sampling mask a phase mask having randomly arranged groups of substantially equal numbers of phase shifting areas having phase shifts differing by discrete amounts such that each of said transmissive areas is aligned with each of said phase shifting areas;
   c. illuminating said superimposed masks with a coherent light beam to provide sampled beams of light;
   d. illuminating a photographic film with said sampled beams; and
   e. simultaneously illuminating said photographic film with a reference light beam to produce thereon an interference fringe pattern of said sampling array.

11. A holographic recording system as claimed in claim 10, wherein the step of illuminating a photographic film with said sampled beams includes forming an optical Fourier transform of said sampling mask on said film.

12. A holographic recording system as claimed in claim 10, wherein said phase mask has a plurality of groups of recesses having depths differing by discrete amounts and arranged randomly thereon to impart a phase shift in the range from 0° to 360°, said groups each having complementary phase shift in said range.

* * * * *